Figures 1, 2:
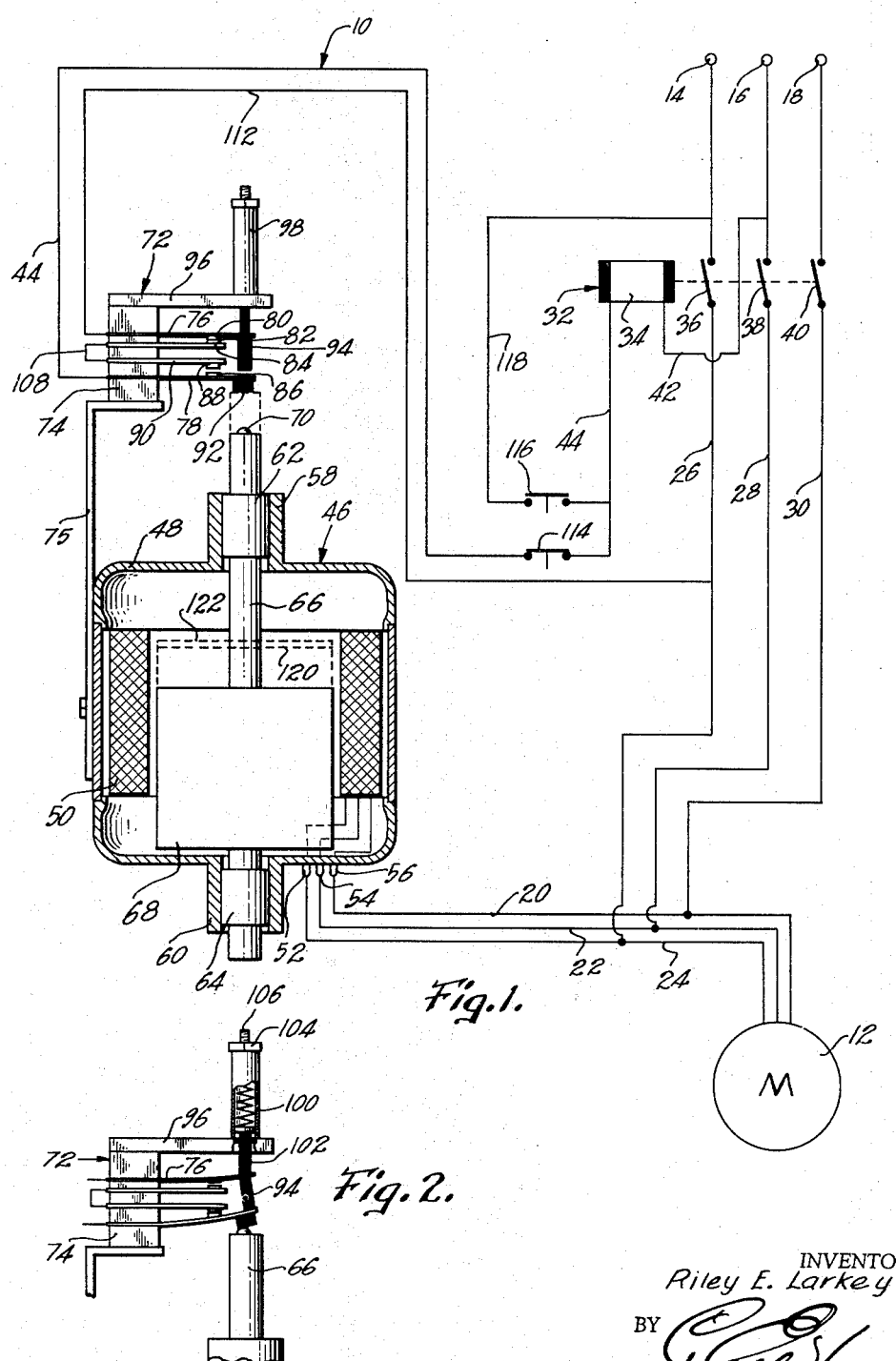

INVENTOR.
Riley E. Larkey
BY
ATTORNEY

United States Patent Office 3,001,099
Patented Sept. 19, 1961

3,001,099
PROTECTING DEVICE FOR THREE PHASE MOTOR HAVING SHIFTABLE ROTOR AS A PART OF THE ASSEMBLY
Riley E. Larkey, 209 S. Montgomery St., Clarksville, Ark.
Filed Mar. 23, 1959, Ser. No. 801,323
12 Claims. (Cl. 317—13)

This invention relates to electrical protective devices for motors or the like and has for its primary object to provide apparatus for protecting main, three phase, alternating current electric motors against operation during application thereto of electrical power of other than normal three phase characteristics or of excessive or inadequate potential level in any phase of the power.

A further important object is to provide an electrical protective device for three phase, alternating current motors which includes a relatively small, modified three phase electrical motor having a rotatable as well as reciprocable rotor therein which is disposed to engage and thereby open and close, switches operably coupled with the main motor in a manner to discontinue operation of the latter at any time that electrical power of other than normal three phase characteristics or of excessive or inadequate potential level in any phase thereof is applied to the main motor.

A further important object of the invention is to provide a protective device as referred to above for preventing damage to three phase, alternating current motors which is constructed of relatively simple components which may be manufactured and distributed at a minimum cost and which automatically interrupts flow of current to the main three phase motor if an irregularity occurs in the potential level of the current flowing to any phase of the main motor.

Other important objects and details of construction of the present protective apparatus will become obvious or be explained in greater detail as the following specification progresses.

In the drawing:

FIGURE 1 is a schematic representation of a protective device for a three phase motor and including an auxiliary protective device which is illustrated in its normally inactive position prior to energization of the circuits connected to the main motor; and FIG. 2 is a fragmentary, enlarged view of one portion of the protective device and illustrating another position of the rotor shaft of the protective device during the period that improper current is applied to the main motor.

Protective apparatus broadly numerated 10 is adapted for protecting a main, three phase, alternating current motor 12 against operation during application thereto of electrical power of other than three phase characteristics or of excessive or inadequate potential level in any phase of such power. The three A.C. power source terminals 14, 16 and 18 are coupled to three lines 20, 22 and 24 leading to corresponding field windings of motor 12, by leads 26, 28 and 30 interconnecting respective terminals 14, 16 and 18 with corresponding lines 20, 22 and 24.

A relay broadly numerated 32 has a holding coil 34 and individual, normally open, single pole, single throw relay switches 36, 38 and 40 interposed in leads 26, 28 and 30 respectively. Conduit 42 connecting one lead of coil 34 to lead 28 provides energy to coil 34, while the other terminal of the same is connected to a line 44 leading to a switch to be hereinafter described in detail.

Apparatus 10 additionally includes a miniaturized, three phase, alternating current auxiliary motor 46 provided with a housing 48 having field windings 50 therein corresponding to each phase of the current supplied from the source terminals 14, 16 and 18. It is therefore to be understood that the input terminals 52, 54 and 56 of motor 46 and having respective lines 20, 22 and 24 coupled thereto, are joined to respective field windings 50 of auxiliary motor 46.

Housing 48 has opposed, vertically disposed, cylindrical bosses 58 and 60 at the upper and lower ends thereof respectively and rotatably and slidably receiving respective enlarged sections 62 and 64, preferably integral with an elongated shaft 66 extending outwardly from bosses 58 and 60 and carrying rotor 68 within housing 48 and surrounded by field windings 50. Shaft 66 has a relatively small, semihemispherical shaped projection 70 integral with the uppermost end thereof and disposed to contact a switch arm of control switching means broadly numerated 72.

Switching means 72 includes a block 74 of non-conductive material, mounting a pair of relatively long, flexible, parallel, vertically spaced switch arms 76 and 78 respectively, with the contact 80 of arm 76 normally engaging a contact 82 on a nonmovable switch arm 84, while contact 86 on switch arm 78 is normally out of contacting engagement with a contact 88 on switch arm 90 disposed between switch arms 78 and 74. Block 74 is mounted on an L-shaped bracket arm 75 adjustably secured to the housing 48 of motor 46 for vertical movement relative thereto. A relatively short stop element 92 of insulating material secured to the underface of switch arm 78 is disposed to be engaged by projection 70 on shaft 66, while another cylindrical member 94, likewise of insulating material, is secured to the underface of switch arm 76 and is normally disposed with the lowermost end thereof in predetermined spaced relationship from the uppermost surface of switch arm 78.

Bracket arm 96 mounted on the upper end of block 74 and extending laterally therefrom in overlying relationship to switch arm 76, mounts a cylinder 98 disposed in an upright position and receiving a coil spring 100 therewithin, biasing a plunger 102 toward the lowermost end of its path of travel and extending downwardly into engagement with the upper surface of switch arm 76. It is to be noted that a cap 104, removably disposed over the uppermost end of cylinder 98, mounts a reciprocable element 106, permitting variation of the tension of coil spring 100.

Switch arms 84 and 90 are electrically interconnected by a lead 108, while switch arm 78 is connected to coil 34 by a line 44. Switch arm 76 is electrically coupled to lead 26 by a line 112. A normally closed, manual, single pole, single throw stop switch 114 is interposed in line 44, and a normally open, manual, single pole, single throw start switch 116 is coupled in series within a line 118 interconnecting line 44 and lead 26 on opposite sides of coil 34.

In operation, it is initially to be noted that shaft 66 and thereby rotor 68 are disposed in the full line position illustrated in FIG. 1 when protective apparatus is inactive and all of the switches 36, 38 and 40 are in an open position by virtue of coil 34 of relay 32 being deenergized. It can be seen that when shaft 66 is at the lowermost end of its path of travel, projection 70 thereon is disposed out of contacting relationship with switch arm 78 whereby contacts 80 and 82 are engaged while contacts 86 and 88 are disposed in spaced relationship. Thus, even though lines 118 and 44 are connected to lead 26 from terminal 14, no current passes to coil 34 or switch means 72 by virtue of start switch 116 being disposed in an open position.

When it is desired to operate main motor 12, it is merely necessary for the operator to manually close switch 116 whereby coil 34 of relay 32 is energized through a circuit traced by lead 28, conduit 42, coil 34, line 44, switch 116, line 118 and lead 26 to terminal 14. Energization of coil 34 causes ganged switches 36, 38 and 40 to close and thereby effect operation of main motor 12 through leads 26, 28 and 30 as well as respective lines 20, 22 and 24. The field windings 50 of auxiliary motor 46 are likewise energized through lines 20, 22 and 24 connected to corresponding terminals 52, 54 and 56.

The magnetic field formed by energized windings 50 causes rotor 68 and thereby shaft 66 to rotate upon the longitudinal axis thereof and at the same time, be reciprocated upwardly to the dotted line position 120 by virtue of the disposition of field windings 50 relative to rotor 68. When rotor 68 reaches position 120, projection 70 on shaft 66 engages stop element 92 and shifts switch arm 78 to a position with the contact 86 thereof engaging contact 88, whereby a circuit effecting energization of coil 34 may be traced by terminal 16, lead 28, conduit 42, coil 34, line 44 and including switch 114, switch arm 78, contact 86, contact 88, switch arm 90, lead 108, switch arm 84, contact 82, contact 80, switch arm 76, line 112, lead 26 and including closed switch 36 and terminal 14. Thus, manual switch 116 may be released to permit the same to return to its normally open position and coil 34 will remain energized by virtue of the circuit traced immediately above.

It is to be pointed out that rotor 68 is maintained at the position 120 throughout the time that electrical energy is flowing to field windings 50 of proper three phase characteristics and of predetermined adequate potential level in all phases thereof.

If for any reason whatsoever, the potential level of the electric current flowing to main motor 12 through leads 26, 28 and 30, as well as to auxiliary motor 46 through lines 20, 22 and 24, increases above a predetermined level, the magnetic field produced by field windings 50 is correspondingly increased sufficiently to cause rotor 68 to be shifted to the position 122, thereby moving shaft 66 upwardly and causing switch arm 78 to be flexed sufficiently to engage and move member 94 upwardly to a location shifting contact 80 out of engagement with contact 82 as switch arm 76 is shifted against the action of coil spring 100 biasing plunger 102 into engagement with the upper surface of switch arm 76. Opening of the switch defined by switch arms 76 and 84, as well as contacts 80 and 82, effects deenergization of coil 34 by virtue of breaking of the circuit thereto, whereby ganged switches 36, 38 and 40 automatically move to open positions deenergizing motor 12 as well as auxiliary motor 46.

It can also be seen that if the potential level in any of the phases of energy supplied to main motor 12 falls below a predetermined level, the magnetic field of auxiliary motor 46 decreases and permits rotor 68 to shift toward the lowermost end of its path of travel. Movement of projection 70 on shaft 66 out of engagement with stop element 92 permits switch arm 78 to shift downwardly to a location breaking the electrical connection between contacts 88 and 86, whereby the circuit to coil 34 is likewise interrupted and causing simultaneous opening of switches 36, 38 and 40 to effect deenergization of motors 12 and 46.

As previously noted, the tension on upper switch arm 76 may be varied by adjusting the tension of coil spring 100, which thereby permits variation of the current differential required to effect discontinuance of the operation of motors 12 and 46.

It is now apparent that a protective device has been provided which prevents three phase, alternating current motors from being damaged by single phasing, low voltage, high voltage, overloading or excessive change in potential in any of the phases thereof.

Having thus described the invention what is claimed as new and desired to be secured by Letters Patent is:

1. In apparatus for controlling a main, three phase, alternating current electric motor having three electrical power input terminals adapted for coupling with the three corresponding electrical power source terminals of a three phase, alternating current power source and for protecting said main motor against operation during application to said power input terminals thereof of electrical power of other than three phase characteristics or of excessive or inadequate potential level in any phase of said power, first circuit means operably coupling said input terminals with corresponding source terminals; first switching means interposed in said first circuit means; electrically responsive means operably coupled with said first switching means for controlling actuation of the latter; second circuit means operably coupling said electrically responsive means with said source terminals; second switching means interposed in said second circuit means; an auxiliary, three phase, alternating current, electric motor having field windings coupled with control input terminals and a rotor mounted in said housing for rotation upon and reciprocation along an axis through said windings, said rotor occupying a first position of reciprocation when said auxiliary motor is deenergized, a second position of reciprocation spaced from said first position thereof when said auxiliary motor is energized by electrical power of other than three phase characteristics or of inadequate potential level in any phase of said power, a third position of reciprocation spaced from said first and second positions thereof when said auxiliary motor is energized by three phase, electrical power of predetermined, proper potential level in all phases of said power, and a fourth position of reciprocation spaced from said first, second and third positions thereof when said auxiliary motor is energized by three phase, electrical power of excessive potential level in any phase of said power; actuating means connected to said rotor for reciprocation therewith and extending out of said windings; and third circuit means interconnecting said input terminals of the auxiliary motor with corresponding circuit means interconnecting said source terminals and the input terminals of said main motor, said second switching means being disposed to be actuated by said actuating means connected to said rotor for maintaining said second switching means in an open condition except when said rotor is in said third position thereof.

2. Apparatus as set forth in claim 1 wherein said second switching means includes a first, normally open, single pole, single throw control switch disposed to be closed by said component when the latter is in said third and fourth positions thereof.

3. Apparatus as set forth in claim 2 wherein said second switching means includes a second, normally closed, single pole, single throw control switch disposed to be opened by said component when the latter is in said fourth position thereof.

4. Apparatus as set forth in claim 3 wherein is provided spring means normally biasing said second control switch into the closed position thereof.

5. Apparatus as set forth in claim 3 wherein said first and second control switches are connected in series circuit relationship.

6. In apparatus for controlling a main, three phase, alternating current, electric motor having three electrical power input terminals adapted for coupling with the three corresponding electrical power source terminals of a three phase, alternating current power source and for protecting said main motor against operation during application to said power input terminals thereof of electrical power of other than three phase characteristics or of excessive or inadequate potential level in any phase of said power, a relay having an operating coil and three normally open, single pole, single throw, relay switches adapted to close when said coil is energized; three power lead circuits each having one of said relay switches coupled in series therewith for respectively coupling said power input terminals of said main motor with the corresponding of said power source terminals; an auxiliary, three phase, alternating current, electric motor having a housing, field windings in said housing and coupled with three control voltage input terminals, and a shaft having a rotor thereon and mounted in said housing for rotation upon and reciprocation along an upright axis, said rotor occupying a first, lowermost position of reciprocation when said auxiliary motor is deenergized, a second, higher position of reciprocation when said auxiliary motor is energized by electrical power of other than three phase characteristics or of inadequate potential level in any phase of said power, a third, still higher position of reciprocation when said auxiliary motor is energized by three phase, electrical power of predetermined, proper potential level in all phases of said power, and a fourth, highest position of reciprocation when said auxiliary motor is energized by three phase, electrical power of excessive potential level, said shaft extending out of said housing; a first, normally open, single pole, single throw control switch operably coupled with said shaft for closing of said first control switch when said shaft is shifted into its said third and fourth positions; a second, normally closed, single pole, single throw control switch operably coupled with said shaft for opening of said second control switch when said shaft is moved into its said fourth position; first circuit means coupling each control voltage input terminal of said auxiliary motor with a corresponding power input terminal of said main motor; a normally closed, manual, single pole, single throw, stop switch; a normally open, manual, single pole, single throw, start switch; second circuit means coupling said start switch and said operating coil in series circuit between a pair of said power terminals; and third circuit means coupling said stop switch and both of said control switches in series circuit between a point of said second circuit means disposed between said start switch and said operating coil and one of said power lead circuits other than that one of the latter to which said operating coil is coupled when said start switch is open.

7. In apparatus for controlling a main, three phase, alternating current electric motor having three electrical power input terminals coupled with corresponding electrical power source lines, adapted for protecting said main motor against operation during application thereto of electrical power of improper potential, and including switch means interposed in each of said lines, electrically responsive means operably coupled with said first switching means for controlling actuation of the latter and circuit means coupling said electrically responsive means to at least a pair of said lines, the improvement of which comprises an auxiliary, three phase, alternating current motor having field windings coupled with control input terminals adapted to be connected to respective power lines, and a rotor mounted in said housing for rotation upon and reciprocation along an axis through said windings, said rotor occupying a first position of reciprocation when said auxiliary motor is deenergized, a second position of reciprocation spaced from said first position thereof when said auxiliary motor is energized by electrical power of other than three phase characteristics or of inadequate potential level in any phase of said power, a third position of reciprocation thereof when said auxiliary motor is energized by three phase, electrical power of predetermined, proper potential level in all phases of said power, and a fourth position of reciprocation spaced from said first, second and third positions thereof when said auxiliary motor is energized by three phase, electrical power of excessive potential level in any phase of said power; actuating means connected to said rotor for reciprocation therewith and extending out of said windings; and second switch means interposed in said circuit means for controlling actuation of said electrically responsive means, said second switch means being disposed to be actuated by said actuating means connected to said rotor for maintaining said second switch means in an open condition except when said rotor is in said third position thereof.

8. Apparatus as set forth in claim 7 wherein said second switching means includes a first, normally open, single pole, single throw control switch disposed to be closed by said component when the latter is in said third and fourth positions thereof.

9. Apparatus as set forth in claim 8 wherein said second switching means includes a second, normally closed, single pole, single throw control switch disposed to be opened by said component when the latter is in said fourth position thereof.

10. Apparatus as set forth in claim 9 wherein is provided spring means normally biasing said second control switch into the closed position thereof.

11. Apparatus as set forth in claim 9 wherein said first and second control switches are connected in series circuit relationship.

12. Apparatus as set forth in claim 7 wherein said rotor is reciprocable along a vertical path of travel and is gravitationally biased toward said first position thereof.

References Cited in the file of this patent

UNITED STATES PATENTS

| | | |
|---|---|---|
| 1,775,658 | Seeger | Sept. 16, 1930 |
| 1,800,256 | Keller | Apr. 14, 1931 |
| 1,844,112 | Wood | Feb. 9, 1932 |
| 1,906,817 | Seeley | May 2, 1933 |
| 2,200,085 | Hildebrand | May 7, 1940 |
| 2,431,886 | Pavitt | Dec. 2, 1947 |